Dec. 13, 1960 R. J. SCHULENBERG 2,964,620
SUPPLY POLARITY CONTROL FOR RADIO RECEIVER
Filed Nov. 12, 1959 3 Sheets-Sheet 1
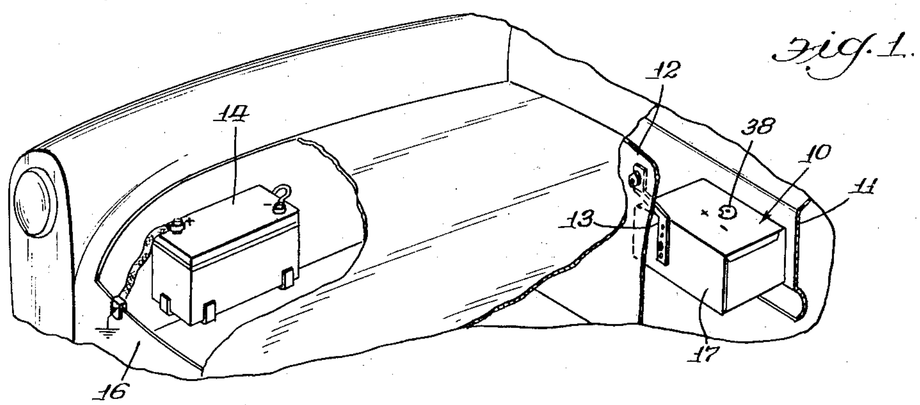
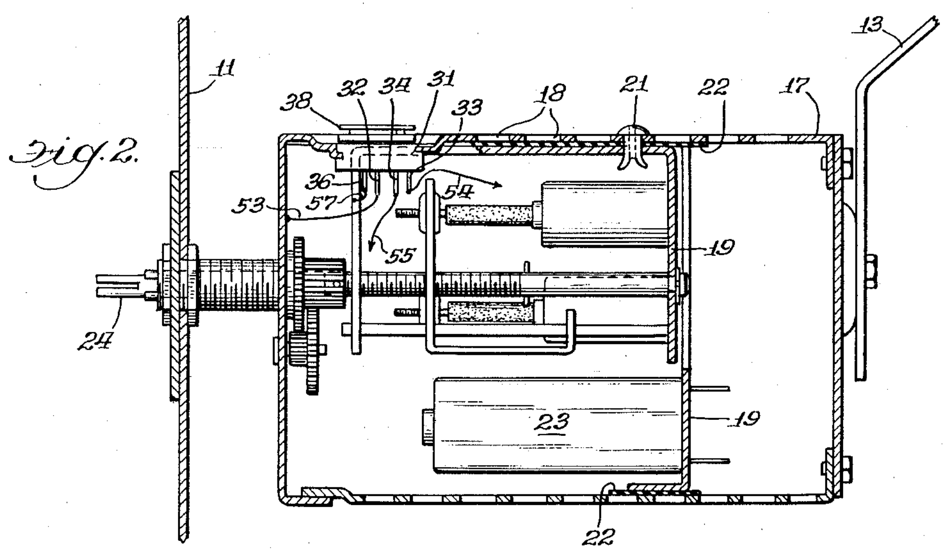
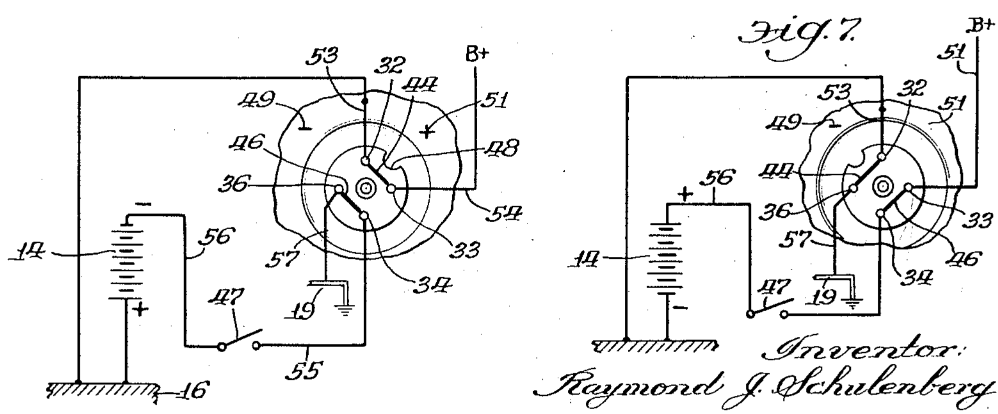
Inventor:
Raymond J. Schulenberg
By Mueller & Aichele
Attys.

SUPPLY POLARITY CONTROL FOR RADIO RECEIVER
Filed Nov. 12, 1959 3 Sheets-Sheet 2
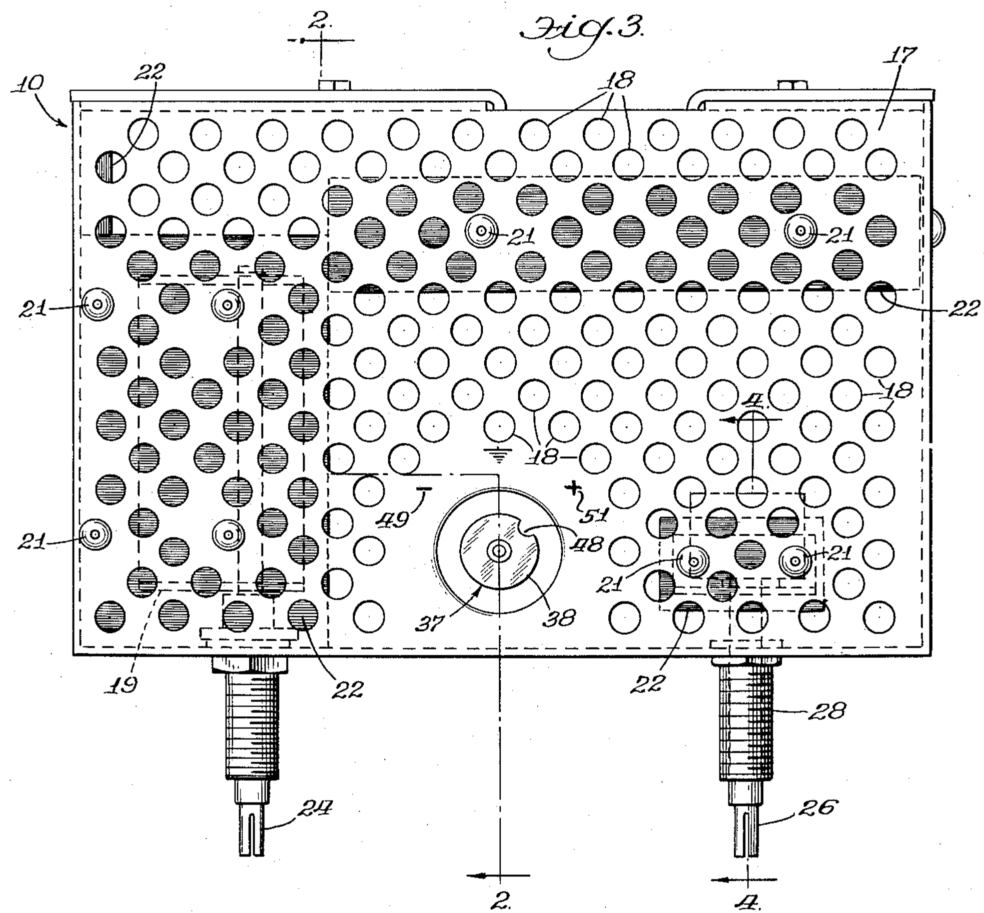
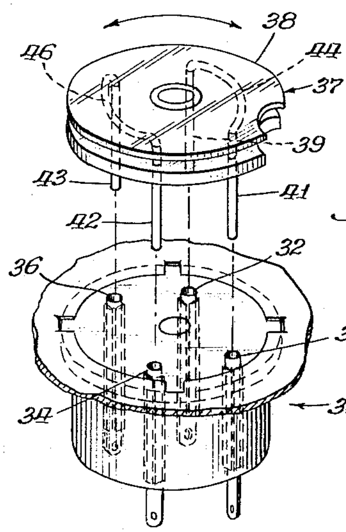
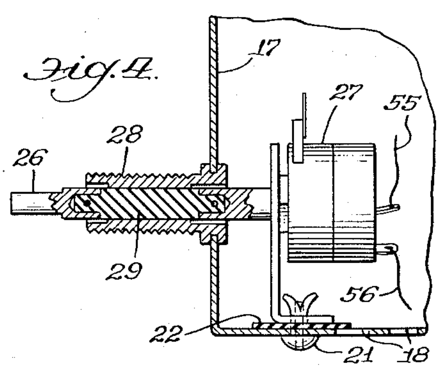
Inventor:
Raymond J. Schulenberg
By Mueller & Aichele
Att'ys.

SUPPLY POLARITY CONTROL FOR RADIO RECEIVER
Filed Nov. 12, 1959 3 Sheets-Sheet 3
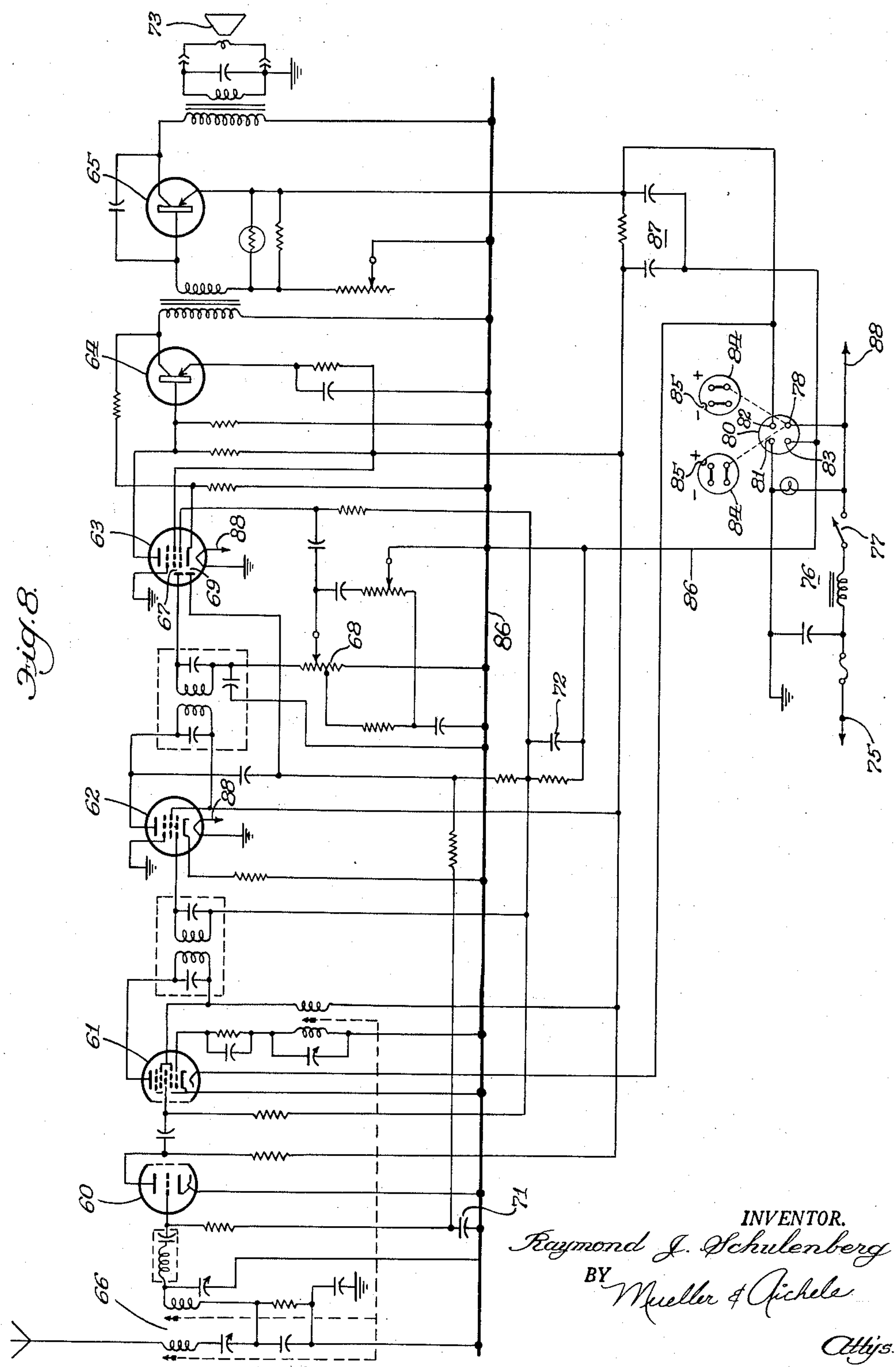
INVENTOR.
Raymond J. Schulenberg
BY Mueller & Aichele
Attys.

United States Patent Office 2,964,620

Patented Dec. 13, 1960

2,964,620

SUPPLY POLARITY CONTROL FOR RADIO RECEIVER

Raymond J. Schulenberg, Chicago, Ill., assignor to Motorola, Inc., Chicago, Ill., a corporation of Illinois Filed Nov. 12, 1959, Ser. No. 853,672

8 Claims. (Cl. 250—14)

This invention relates to radio receivers and more particularly to radio receivers adapted for use in vehicles having batteries and wherein either the positive or negative terminal of the battery is connected to the frame. This is a continuation in part of application Serial No. 776,959, filed November 28, 1958, now abandoned.

In vehicles such as automobiles, the body frame serves as the ground connection for the vehicle electrical system. A storage battery is used in the electrical system and the polarity of the frame is determined by the polarity of the battery connection thereto. Some automobile manufacturers connect the frame to the positive terminal while others connect it to the negative terminal of the storage battery. This diversity of the ground frame polarity presents a substantial problem to the radio manufacturer whose product is sold to the car owner for installation after the purchase of the vehicle. Heretofore, it has been necessary to provide two different types of radio sets one adapted for use in a car of each type of ground polarity. It would obviously reduce overall manufacturing costs if it were possible to provide a receiver easily adaptable to use with either type of grounding frame.

It is an object of the present invention, therefore, to provide a vehicle radio receiver easily adapted for use in a vehicle having either a positive or negative grounded electrical system without making any changes or adjustments in the internal circuitry of the receiver.

It is a further object of the invention to provide simple and inexpensive connector means for coupling a radio receiver to the electrical system of a vehicle so that the receiver will operate from either a positive or a negative grounded system.

A feature of the invention is the provision of an automobile radio receiver within a conducting housing for mounting on the frame of the automobile, wherein the receiver includes a chassis having an insulated negative return line, so that the receiver circuit can be connected to the battery of the automobile irrespective of the polarity of the battery which is connected to the frame. The negative return line may be formed by the chassis itself or by an insulated conductor provided on the chassis.

Another feature of the invention is the provision of a radio receiver with a component mounting chassis electrically insulated from the grounded housing member containing it so that it may be used in an automobile irrespective of the polarity of connection of the battery to the frame.

A further feature of the invention is the provision of an automobile radio receiver energized through a switching arrangement which connects the voltage supply to the radio receiver with a given polarity irrespective of the polarity of the battery grounded to the frame of the automobile. This may be provided by a plug and socket combination wherein the plug is insertable into the socket in two alternate positions.

In the accompanying drawings:

Fig. 1 is a perspective view of a portion of an automobile showing the positioning of the radio receiver of the present invention therein and the connection of a storage battery to the vehicle frame.

Fig. 2 is a view in vertical section taken on the line 2—2 of Fig. 3 illustrating the radio receiver chassis within an external housing;

Fig. 3 is a plan view of a radio receiver unit in accordance with the present invention;

Fig. 4 is a view in section taken on the line 4—4 of Fig. 3;

Fig. 5 is a perspective view of a plug and socket connector combination in accordance with the present invention;

Fig. 6 is a schematic diagram showing the electrical connection of the radio receiver to a vehicle electrical system having its positive terminal connected to the vehicle frame;

Fig. 7 is a view similar to Fig. 6 but showing the positioning of the plug member for use in a vehicle wherein the negative terminal of the electrical system is connected to the vehicle frame; and Fig. 8 is a circuit diagram illustrating another embodiment of the invention.

The radio receiver of the present invention includes an external housing adapted to be mounted on the frame of an automobile or similar vehicle. The receiver chassis upon which the various electronic components are mounted is positioned within the housing and may be electrically insulated therefrom so that the chassis polarity will be independent of that of the housing and vehicle frame. Alternately the chassis may include an insulated negative return line in which case the entire chassis need not be insulated from the housing. A plug and socket connector combination is positioned on the housing with the socket having four symmetrically spaced terminals one of which is connected as voltage supply terminal for the receiver. A four pronged plug is insertable into the socket and may be inserted in either of two alternate positions one of which connects the supply terminal to the vehicle frame and the other which connects this terminal to the ungrounded side of the battery. It is usual to supply positive operating potential to the radio receiver so that the supply terminals should be positive and will be positive regardless of the polarity of the battery which is connected to the vehicle frame. During installation of the receiver in the car, the connector plug is merely inserted in the socket in the correct position and the receiver is ready for use.

Fig. 1 of the accompanying drawings illustrates the mounting of the radio receiver generally indicated at 10 behind the dashboard 11 of a vehicle. The receiver is shown as secured to the fire wall 12 of the vehicle by means of a bracket 13. A storage battery 14 is under the hood of the automobile and is shown with its positive terminal connected to the frame indicated by reference character 16. The dashboard and the fire wall are electrically a part of frame 16.

As best shown in Fig. 2, the receiver 10 includes an external housing 17 whose top and bottom contain a plurality of openings 18 for air cooling the receiver components. The chassis of the receiver within the housing 17 is made up of angle brackets 19 which are secured to the housing by means of a plurality of plastic rivets 21 inserted through the openings 18 and corresponding openings in the brackets. The layers of insulating tape 22 space the chassis-forming brackets from the housing and electrically insulate the chassis from the housing and hence from the grounding frame 16.

The particular design of the receiver itself forms no part of the present invention and it may be an all transistor set, an all tube set or a so-called hybrid set containing both the tubes and the transistors. Although Fig. 2 shows components such as the coil 23 mounted along a horizontal axis, it will be understood that the components may be mounted either horizontally or vertically provided that there is sufficient clearance between the chassis and the external housing so that there will be no connection between the components and the housing.

The receiver includes the usual tuning control shaft 24 and the volume control shaft 26. Since the tuning shaft 24 merely performs a mechanical function and is not electrically connected to the circuit of the receiver, it may be connected through the housing in a conventional manner and extends as shown in Fig. 2 through the dashboard 11 so that its one end is within easy reach of the operator of the car. The volume control shaft 26 on the other hand, may be connected to a potentiometer 27 which is a circuit element, and for this reason it may be necessary to provide an insulating bushing 28 (Fig. 4) around the shaft to insulate it from the metal housing 17. The volume control shaft 26 is also provided with an intermediate portion 29 which is made of an insulating material such as wood or plastic in order to prevent an external electrical connection being made through the potentiometer 27 to the chassis members 19.

A socket member 31 as shown in detail in Fig. 5 is positioned in the top of the housing 17. The socket includes four symmetrically spaced connector receiving lugs 32, 33, 34 and 36. The plug member 37 includes an insulating disc 38 in which are imbedded a pair of U-shaped metallic members forming the connector prongs 39, 41, 42 and 43. The prongs 39 and 41 are electrically connected through the intermediate portion 44 while prongs 42 and 43 are similarly connected through the intermediate portion 46. The plug 37 may be fitted into the socket 31 with prong 39 fitting into lug 32, prong 41 fitting into lug 33, prong 42 fitting into lug 34, and prong 43 fitting into lug 36. Alternatively, the disc 38 may be rotated through 90° so that prong 39 fits into lug 36, prong 41 fits into lug 32, prong 42 fits into lug 33 and prong 43 fits into lug 34.

The connection of the socket 31 is illustrated in Figs. 2, 6 and 7. The lug 32 is connected through conductor 53 to the receiver housing 17 which is electrically connected to the frame 16 of the automobile. The lug 33 is connected through conductor 54 to the components of the receiver to provide B+ potential therefor. The lug 34 is connected to lead 55 connected to the switch 47 which may be incorporated in the line control potentiometer shown in Fig. 4. The other side of the switch is connected to lead 56 to the ungrounded side of the vehicle battery. The lug 36 is connected to the chassis of the receiver and may be connected to the angle bracket 19 through conductor 57.

The position of insertion of the plug 37 into socket 31 depends upon the polarity of the automobile frame as controlled by the method of connection of the battery. Fig. 6 illustrates schematically the connected formed in a vehicle having a positive grounding frame. The socket 31 is positioned so that lug 33 is the B+ supply terminal for the receiver with lug 32 connected directly to the frame of the car. Lug 34 is connected through the on-off switch 47 to the ungrounded or "hot" side of the battery 14 with lug 36 electrically connected to the receiver chassis 19. With the plug inserted in the position indicated in Fig. 6 which shows the battery having its positive side connected to the frame 16 the B+ supply terminal 33 is connected to the frame 16 through the intermediate portion 44 which connects it to lug 32. Lugs 34 and 36 are connected by intermediate portion 46 to the negative side of the battery to make the chassis 19 negative.

In a vehicle in which the storage battery has its negative terminal connected to the frame the only difference in installation of the radio receiver is the insertion of the plug 37 into socket 31 into a position indicated schematically in Fig. 7. In this position, the intermediate portion 46 connects B+ supply terminal 33 to lug 34 which is connected through switch 47 to the ungrounded or, in this case, positive side of battery 14. Intermediate portion 44 bridges lugs 32 and 36 so that the chassis 19 is now connected directly to the negative frame 16. It will be seen that in both situations the lug 33 supplies positive voltage whereas the chassis 19 serving as ground for the receiver is negative.

The disc 38 of the socket 37 is provided with a notch 48 in its edge and indicia 49 and 51 are provided on the housing indicative of ground plurality. The person installing the receiver simply inserts the plug 37 in a position with the notch adjacent the sign indicating the polarity of the frame 16. Thus, the receiver is adaptable for use with a ground of either polarity by an external adjustment that is extremely easy to make during installation and does not require any changes in the receiver circuitry. The invention makes it possible, therefore, to market a receiver of a single selected design that can be used in a vehicle having a frame of either polarity.

Once the plug is inserted in the proper position it cannot become displaced and thus provides a permanent and positive electrical connection between the receiver and the electrical system of the vehicle.

In Fig. 8 there is shown the circuit of a radio receiver which may be used with the power supply arrangement in accordance with the invention. As previously stated, the receiver may be provided with a chassis which is insulated from the housing or the receiver may have a return line which is insulated from the housing. In Fig. 8 the circuit of a receiver having an insulated return line is shown.

The receiver of Fig. 8 is of the hybrid type including tubes 60, 61, 62 and 63 and transistors 64 and 65. An antenna input circuit 66 is provided which feeds received signals to the radio frequency amplifier including tube 60. The radio frequency signals are applied to a converter stage including tube 61. The tubes 60 and 61 may be included in a single envelope. The intermediate frequency signals from the converter are applied to an intermediate frequency amplifier including tube 62.

The amplified intermediate frequency signals are applied to tube 63 which forms a detector and first audio frequency amplifier. The modulating or audio signals are derived by the detector circuit including diode 67 and developed across volume control potentiometer 68. The audio signals are applied to the amplifier section included within the tube 63. The tube 63 also includes a diode section 69 which is connected in an automatic gain control circuit to control the gain of the four tube stages. Full gain control is developed across capacitor 71 and applied to the grid of tube 60, and a part of the gain control voltage is developed across capacitor 72 and applied to the grids of tubes 61, 62 and the amplifier section of tube 63.

The audio output from tube 63 is fed to the driver transistor stage 64 and to the audio power amplifier stage 65. The audio output is applied to loudspeaker 73 which provides the sound output of the receiver.

The receiver may be powered from the 12 volt electrical system of a vehicle through a connection to terminal 75. This is applied through filter 76 and the on-off switch 77 of the receiver to terminal 78 of the polarity reversing socket 80. The socket includes a terminal 81 connected to the receiver housing, a terminal 82 which supplies the B+ potential for the receiver, and a terminal 83 which forms the negative return terminal of the receiver. These various terminals may be interconnected in different ways by plug 84. The plug is shown at the left in Fig. 8 positioned to provide the proper connections when the receiver is installed in an automobile having the positive battery terminal grounded to the automobile frame. The notch 85 in the plug is in such case turned toward the plus sign.

When the plug 84 is positioned for use in a vehicle having the positive battery terminal grounded to the frame, the negative voltage from terminal 75 is applied to terminal 78 of the socket and through plug 84 to terminal 83 which is connected to the insulated negative return line 86. The terminal 81 which is connected to the receiver housing is connected through the plug 84 to terminal 82 which provides the B+ supply. This provides the desired connections since the positive terminal of the battery is connected to the automobile frame which is in turn connected to the housing of the receiver and through the plug to the B+ line. The positive B+ potential is applied across filter 87 and connected to all of the tube and transistor stages. The negative return connections from the antenna circuit, the audio detector circuit, the automatic gain control circuit and the various tube and transistor stages, are completed through the insulated line 86 back to the pin 83 of socket 80, and through the plug to terminal 78 to the negative connection of the battery.

It is to be noted that tubes 62 and 63 have their heaters connected to conductor 88 which is connected directly to the battery lead from terminal 75. These heaters are therefore energized from either positive or negative potential, depending upon the connection of the battery to the frame of the vehicle. Since these heaters merely provide heater current to cause the cathodes to emit electrons, the polarity of the supply potential is not material. The heater of the cathodes of tubes 60 and 61 however is connected between the terminal 82 and the return line 86. This is necessary since the cathode of the tube 60 is directly connected to the heater and must be at a negative potential with respect to the anode of this tube.

When it is desired to install the receiver in a vehicle having the negative battery terminal grounded to the frame, the plug 84 is positioned as shown at the right in Fig. 8, with the notch 85 turned toward the minus sign. In such case the positive potential from lead 75, through filter 76 and switch 77, is applied to terminal 78 and through plug 84 to terminal 82 connected to provide the B+ potential for the receiver. The negative return line 86 is connected from terminal 83 through plug 84 to terminal 81 which is grounded to the receiver housing. Accordingly the positive potential is applied to the B+ line and the return is completed through line 86 to the receiver housing, which is grounded to the frame, and which is in turn connected to the negative terminal of the battery.

The present invention, therefore, provides a radio receiver adapted for use in a vehicle having either a positive or negative ground. This result may be accomplished by insulating the receiver chassis from the housing mounted on the grounded frame or by providing an insulated negative return in the chassis, and by making connection to the receiver through a switching arrangement which permits connection of the supply and return circuits of the receiver to either the battery or the frame. A plug and socket arrangement may be used with the plug inserted in the socket in either of two alternate positions to supply a voltage to the receiver of a desired polarity whether the battery is connected with its positive or negative terminal to the grounding frame of the vehicle.

What is claimed is:

1. A radio receiver for use in a vehicle having a storage battery with one terminal thereof grounded to the vehicle frame and a second ungrounded terminal, said receiver including in combination, an exterior conducting housing adapted for mounting on the frame of the vehicle and to be electrically connected thereto, electrical components within said housing connected to provide a receiver circuit, a positive potential circuit and a negative potential circuit connected to the electrical components and insulated from said housing, a socket mounted on said housing and including first, second, third and fourth prong-receiving lugs, said first lug being coupled to said positive potential circuit, said second lug being connected to said receiver housing, said third lug being adapted to be connected to the ungrounded terminal of the vehicle storage battery, and said fourth lug being connected to said negative potential circuit, and a plug including two U-shaped conducting members each making up a pair of connected prongs, said plug being insertable into said socket in first and second different positions, said first position connecting said first and second lugs and connecting said third and fourth lugs, and said second position connecting said first and third lugs and connecting said second and fourth lugs, said first position providing proper operating potentials for the receiver in a vehicle having the positive terminal of the battery grounded to the vehicle frame and said second position providing the proper operating potential for the receiver in a vehicle having the negative terminal of the battery grounded to the vehicle frame.

2. A radio receiver for use in a vehicle having a storage battery with one terminal thereof grounded to the vehicle frame and a second ungrounded terminal, said receiver including in combination, an exterior housing adapted for mounting on the frame of said vehicle, a chassis including electrical components within said housing having a return circuit insulated from said housing and connected to said electrical components, a positive potential supply circuit connected to said components, a socket mounted on said housing and including first, second, third and fourth prong-receiving lugs, said first lug being coupled to said positive potential supply circuit, said second lug being adapted to be connected to the vehicle frame, said third lug being adapted to be connected to the ungrounded side of the vehicle storage battery, and said fourth lug being connected to said return circuit, and a plug including two U-shaped conducting members each making up a pair of connected prongs and insertable in two alternate positions into said socket, one of said insertion positions connecting said first and second lugs and said third and fourth lugs and the other insertion position connecting said first and third lugs and said second and fourth lugs, with the insertion position being determined by the polarity of the storage battery terminal connected to the frame such that said first lug will be at a positive potential.

3. A radio receiver for use in a vehicle having a storage battery with one terminal thereof grounded to the vehicle frame and a second ungrounded terminal, said receiver including in combination, a conducting exterior housing adapted for mounting on the frame of said vehicle, a chassis within said housing including the electrical components of said receiver, a positive potential supply circuit and a return circuit insulated from the housing and connected to a plurality of said electrical components, connecting means mounted on said housing and including first, second, third and fourth contacts, said first contact being coupled to said positive potential supply circuit, said second contact being connected to said receiver housing, said third contact being adapted to be connected to the ungrounded terminal of the storage battery, and said fourth contact being connected to said return circuit, and movable connecting means including two pairs of electrically connected conductors engageable with said connecting means on said housing in first and second positions, with said first and second contacts and said third and fourth contacts being interconnected through said movable connecting means in the first position, and said first and third contacts and said second and fourth contacts being interconnected through said movable connecting means in the second position.

4. A radio receiver for use in a vehicle having an electrical system including in combination, an exterior conducting housing adapted for mounting on the frame of said vehicle, a conducting chassis within said housing including the electrical components of said receiver, insulating means supporting said chassis from said housing, socket means mounted on said housing and including a voltage supply terminal coupled to the electronic components of said receiver, further terminals of said socket adapted to be coupled to the electrical system of said vehicle, and means insertable into said socket in alternate positions to connect said voltage supply terminal to a predetermined one of said further terminals.

5. A radio receiver for use in a vehicle having a battery providing a direct current potential and having one terminal grounded to the vehicle frame and a second ungrounded terminal, said receiver including in combination, an exterior conducting housing adapted for mounting on the frame of said vehicle, a conducting chassis within said housing including the electrical components of said receiver, means insulating said chassis from said housing, socket means mounted on said housing, said socket means including a voltage supply terminal coupled to the electrical components of said receiver and further terminals adapted to be connected to the vehicle frame and to the ungrounded terminal of the battery, and a plug member including prongs for connecting the voltage supply terminal to the vehicle frame in one inserted position and to the ungrounded terminal of the battery in the other inserted position such that said voltage supply terminal may be of a given polarity with either the positive or negative terminal of the battery connected to the frame.

6. A radio receiver for use in a vehicle having a storage battery with one terminal thereof grounded to the vehicle frame and an ungrounded terminal, said receiver including in combination, an exterior conducting housing adapted for mounting on the frame of said vehicle, a conducting chassis within said housing connected to the electrical components of said receiver, a socket mounted on said housing and including first, second, third and a fourth prong-receiving lugs with said first lug coupled to the components of said receiver as a voltage supply terminal, said second lug being connected to the receiver housing, said third lug being adapted to be connected to the ungrounded terminal of the storage battery, and said fourth lug being connected to said chassis, and a plug including two pairs of electrically connected prongs insertable into said socket in first and second alternate positions with said first and second terminal lugs connected through said plug in the first alternate position and said first and third terminal lugs connected through said plug in said second alternate position.

7. A radio receiver for use in a vehicle having a storage battery with one terminal thereof grounded to the vehicle frame and an ungrounded terminal, said receiver including in combination, an exterior conducting housing adapted for mounting on the frame of said vehicle and to be electrically connected thereto, a conducting chassis within said housing connected to the electrical components of said receiver, a socket connected to said housing, said socket including first, second, third and fourth prong-receiving lugs with said first lug coupled to the components of said receiver as a voltage supply terminal, said second lug being connected to the receiver housing, said third lug being adapted to be connected to the ungrounded terminal of the vehicle storage battery, and said fourth lug being connected to said chassis, and a plug including two U-shaped conducting members each making up a pair of connected prongs with said plug insertable into said socket in two alternate positions, one of which connects said first and second lugs and said third and fourth lugs and the other of which connects said first and third lugs and said second and fourth lugs.

8. A radio receiver for use in a vehicle having a storage battery with one terminal thereof grounded to the vehicle frame and an ungrounded terminal, said receiver including in combination, an exterior housing adapted for mounting on the frame of said vehicle, a conducting chassis within said housing connected to the electrical components of said receiver, a socket mounted on said housing, said socket including first, second, third and fourth prong-receiving lugs with said first lug coupled to the components of said receiver and serving as a positive potential voltage supply terminal, said second lug being adapted to be connected to the vehicle frame, said third lug being adapted to be connected to the ungrounded terminal of the vehicle storage battery, and said fourth lug being connected to said chassis, and a plug including two U-shaped conducting members each making up a pair of connected prongs and insertable in two alternate positions into said socket, one of said alternate insertion positions connecting said first and second lugs and said third and fourth lugs and the other position connecting said first and third lugs and said second and fourth lugs with the insertion position being determined by the polarity of the storage battery terminal connected to the frame such that said first lug will be at a positive potential.

No references cited.